United States Patent
Veil et al.

(10) Patent No.: US 6,778,080 B2
(45) Date of Patent: Aug. 17, 2004

(54) MODULAR SAFETY SWITCHING DEVICE SYSTEM

(75) Inventors: Richard Veil, Stuttgart (DE); Jürgen Baur, Waldstetten (DE); Hans Schwenkel, Stuttgart (DE)

(73) Assignee: Pilz GmbH & Co., Ostfildern (DE)

( * ) Notice: Subject to any disclaimer, the term of this patent is extended or adjusted under 35 U.S.C. 154(b) by 26 days.

(21) Appl. No.: 10/273,316

(22) Filed: Oct. 17, 2002

(65) Prior Publication Data

US 2003/0058623 A1 Mar. 27, 2003

Related U.S. Application Data

(63) Continuation of application No. PCT/EP01/04160, filed on Apr. 11, 2001.

(30) Foreign Application Priority Data

Apr. 22, 2000 (DE) .......................................... 100 20 074

(51) Int. Cl.[7] .............................................. G08B 29/00
(52) U.S. Cl. ........................ 340/506; 340/507; 340/3.1; 307/10.8
(58) Field of Search ............................... 340/506, 507, 340/531, 3.1, 3.7, 286.02; 307/10.8

(56) References Cited

U.S. PATENT DOCUMENTS

| 4,837,739 | A | * | 6/1989 | McGill et al. ............... 710/100 |
| 4,991,056 | A | | 2/1991 | Shimizu et al. |
| 5,196,832 | A | * | 3/1993 | Griffin ........................ 340/663 |
| 5,214,559 | A | | 5/1993 | Zerbian et al. |
| 5,510,971 | A | * | 4/1996 | Forin et al. ............... 363/56.01 |
| 5,764,647 | A | * | 6/1998 | Riley .......................... 370/489 |
| 6,061,261 | A | * | 5/2000 | Chen et al. ................. 363/146 |
| 6,246,318 | B1 | | 6/2001 | Veil et al. |

FOREIGN PATENT DOCUMENTS

| DE | 39 10 718 A1 | 10/1990 |
| DE | 44 32 759 A1 | 3/1996 |
| DE | 195 40 069 A1 | 4/1997 |
| DE | 196 49 593 A1 | 6/1998 |
| DE | 197 07 241 A1 | 9/1998 |
| DE | 197 36 183 C1 | 2/1999 |
| EP | 0 495 388 A1 | 7/1992 |
| EP | 0 505 774 A1 | 9/1992 |

OTHER PUBLICATIONS

Gräf, W.: Maschinensicherheit, Hüthig Verlag 1997.

* cited by examiner

*Primary Examiner*—Daryl Pope
(74) *Attorney, Agent, or Firm*—Harness, Dickey & Pierce, P.L.C.

(57) ABSTRACT

The invention relates to a modular safety switching device system for switching actuators fail-safely off. The system comprises at least one input module for fail-safely evaluating a safety transmitter and for generating an output signal. It further comprises at least one output module for fail-safely actuating the actuator in response to the output signal from the input module. At least the input module can be operated in different selectable operating modes. A control module is provided for individually setting the operating mode of the input module and, if applicable, of the output module. A display is provided for fail-safely displaying the operating modes set.

21 Claims, 3 Drawing Sheets

MODULAR SAFETY SWITCHING DEVICE SYSTEM

CROSS-REFERENCES TO RELATED APPLICATIONS

This application is a continuation of copending international patent application PCT/EP01/04160 filed on Apr. 11, 2001 designating the U.S., which claims priority from German patent application DE 100 20 074.5, filed on Apr. 22, 2000.

BACKGROUND OF THE INVENTION

The present invention relates to a modular system of safety switching devices, i.e. a modular safety switching device system, for switching on and fail-safely switching off actuators. The system comprises at least one input module for fail-safely evaluating a safety transmitter and for generating an output signal, and at least one output module for fail-safely actuating the actuator in response to the output signal from the input module. At least the input module can be operated in different operating modes.

Safety switching devices are generally known. They are generally used to evaluate a signal from a safety transmitter, such as an emergency off switch, a protective door position switch, etc. in a fail-safe manner and to drive one or more fail-safe output contacts of an output circuit. Actuators, such as contactors, valves, motors, hazardous machine parts, for example saw blades, robot arms, high-voltage equipment, etc. are brought into a safe state via these output contacts then. The present assignee distributes a large number of different safety switching device types under the common trade name "PNOZ".

In practice, it often occurs that a plurality of switching events, for example the actuation of an emergency off switch, the opening of a protective door, or reaching through a light curtain, have to be interconnected, for example AND-linked. For this purpose, a plurality of switching devices are usually connected in series, the output terminals of one safety switching device being connected to the input terminals of the following safety switching device.

In many cases, in addition to the AND linking, a hierarchical structure of the safety switching devices is desired, in order, for example, to stop the entire machine with one switching event, for example the emergency off switch in one case, and, with other switching events, for example a protective door switch, to stop only a specific motor in the entire machine or to keep it stationary. Such a hierarchical structure has hitherto been possible by appropriate wiring and it has proved successful in practice.

Nevertheless, there remains a desire to provide a structure of safety switching devices which is more flexible, so that machine-specific evaluation of safety switching events becomes easily possible without complicated wiring.

SUMMARY OF THE INVENTION

Accordingly, it is an object of the present invention to provide a modular safety switching device system which permits flexible linking of the safety switching devices used, without having to perform complicated wiring for linking the individual safety switching devices and in particular without specific wiring for different operating modes of the input modules.

According to one aspect of the invention, this object is achieved by a the modular safety switching device system as mentioned at the outset having a control module for setting the operating mode of the input and output modules, and having a display for fail-safely displaying the set operating modes of the input modules and/or of the output modules.

In the new safety switching device system, therefore, the operating mode of each input and output module can be specifically set via the control module and checked via the display. In the case of the input modules, "operating mode" might include, for example, which output module the input modules are assigned to, i.e. to which output module the output signal from the input module is fed. Further operating modes of the input modules might be, for example: start-up test, acknowledgment, deactive, etc. Operating modes in the case of the output modules are, for example, different delay times for switching off the outputs with a delay, for example 0 seconds, 0.5 seconds or 1 second. The term "fail-safe" is to be understood to mean that the function of the display is checked, so that a faulty display of the operating mode can be ruled out.

The advantage of this modular safety switching device system is a simple and very flexible setting and configuration. In particular, different systems can be achieved with the same modular structure, by changing the assignment of input modules to output modules. Furthermore, hierarchical systems can also be built up, in which for example one input module acts on two output modules and other input modules act on one output module each. These settings and changes can be made without changing the wiring, which not only saves costs in the maintenance and setting up of such a system but also eliminates sources of error which can arise from erroneous wiring.

Overall, therefore, a safety switching device system can be built up which can be configured very flexibly and simply to an extremely wide range of requirements, the configuration being carried out via a central control module. In particular, the output signals from the input modules can be fed to the output modules in any desired manner. In this case, the programs for all the selectable operating modes are stored completely in the control module and are checked and approved by a certification authority, for example the professional association. By means of the configuration, the desired operating modes, preferably the desired programs, are selected and the application-specific program of the safety system is assembled from the standard programs stored in the control module. The advantage is that the checking of application-specific software is not necessary.

A further advantage of the inventive safety switching device system not only resides in the fact that the user can rely on the respective display of the operating mode when setting up the operating modes, and therefore needs no further aids or functional checks, but can also be seen in the fact that production tests can be rationalized, since the device can automatically carry out the test of the display means. A visual and therefore fault-susceptible test of the display in production control can consequently be dispensed with.

In a refinement of the invention, the display comprises a number of optical elements, preferably light-emitting diodes, corresponding to the number of selectable operating modes. Each optical element is preferably assigned a feedback element, preferably an optical conductor, the feedback element guiding the light emitted by the optical element to a light evaluation unit, which checks the state of the optical element.

These measures permit the construction of a fail-safe display with little effort and low costs. The light emitted by the optical element is guided via an optical conductor to an optical sensor, which generates a corresponding signal. This signal is then compared with the reference signal, in order to be able to make a statement as to whether the optical element is operating without faults. The use of light-emitting diodes as optical elements has proven to be particularly beneficial. Furthermore, the use of optical elements on each input and output module (decentralized display means) permits an expensive central display to be dispensed with. In systems which have a relatively large number of modules, however, this advantage decreases again. Of course, it might also be considered to test the optical element for freedom from faults in a different way. One possible way is to impress two different currents on the optical element, preferably an LED, one after the other and to measure the two different voltages. Via a comparator, it is then possible to establish whether the two voltages lie above or below a predefined threshold value. If there are deviations from a predefined result here, there must be a fault.

In another refinement of the invention, the display is implemented as a central display, preferably as a liquid crystal display device. The operating modes of the input module and/or of the output module are preferably displayed in two different types and/or in two mutually independently driven areas of the display, so that a fail-safe representation is achieved.

These measures permit the use of a display, i.e. a monitor, in order to set the operating modes of the input modules and output modules, without safety being lost. As a result of the two different types of representation, the user can specifically detect whether the display is faulty. Apart from the above-mentioned measure, other routes to a solution of making the display fail-safe might also be considered. Furthermore, as compared with the decentralized optical elements, a flat display offers much more convenience when setting the operating modes. In particular, graphic symbols can be used, which very much more clearly impart to the user the set operating modes and the overall structure of the system.

In an alternative refinement of the invention, for a self-monitored display, a self-luminous display can be fit above an image sensor and in this way the image output can be compared with the image actually displayed.

In another refinement of the invention, the input module is implemented with two channels and comprises semiconductor outputs. The control module preferably comprises a logic linking unit, which links output signals from the input modules with one another, preferably AND links them, and feeds them to an output module on the basis of the set operating mode. The output signal from the input module can preferably be fed to each output module, this assignment of input module to output module being carried out via the setting of the operating mode.

Of course, it is also possible for the individual input signals to be read into the control module and evaluated there, linked and fed to the outputs.

These measures have the advantage that a very flexibly configurable safety switching device system can be built up. In particular, the output signals from the individual input modules can be fed to individual or several of the output modules as desired. Different configurations are therefore possible, which could previously only be achieved by changing the wiring.

In a further refinement of the invention, the control module comprises a memory unit, preferably as an EEPROM, in which the selected operating modes of the input module and of the output module can be stored in a manner safe against zero voltage. The current states of the input module and of the output module are stored in a further memory unit, preferably a RAM.

This measure has the advantage that the operating modes and operating states are stored centrally, so that, for example, a check on the state of the entire system can be carried out simply by reading out from these central memories. Consequently, communication with the individual modules for diagnostic purposes is not necessary.

In a further refinement of the invention, the control module is assigned a configuration switch, preferably a key switch, for changing over into a programming mode. The control module preferably comprises an input unit for the input of the operating modes, the input unit in the simplest case comprising at least two cursor keys and a confirmation key.

The use of a key switch has the advantage that an inadvertent changeover into the programming mode, and therefore possibly a change of individual operating modes, is not possible. For the purpose of programming, the system has to be switched over deliberately into the programming mode by rotating the key switch.

The construction of an input unit having at least two cursor keys and a confirmation key permits, firstly, the deliberate addressing and setting of a module and, secondly, permits space-saving accommodation in the safety switching device system with very low costs.

The input into the input unit is not safety-oriented. Erroneous inputs are recognized by means of the fail-safe display by the person carrying out the configuration. It is therefore possible to carry out the input into the input unit in other ways known. For example, an input via an input tool on a computer and an infrared interface (IrDA) into the input unit, with input monitoring via the fail-safe display, can be implemented. The operating mode is configured in the safety device and is displayed.

Further advantages and configurations of the invention emerge from the description and the appended drawing.

It goes without saying that the features mentioned above and those still to be explained below can be used not only in the combination respectively specified but also in other combinations or on their own without departing from the scope of the present invention.

BRIEF DESCRIPTION OF THE DRAWINGS

The invention will be explained in more detail below by using an exemplary embodiment and with reference to the drawings, in which.

DETAILED DESCRIPTION OF PREFERRED EMBODIMENTS

Figure 1:
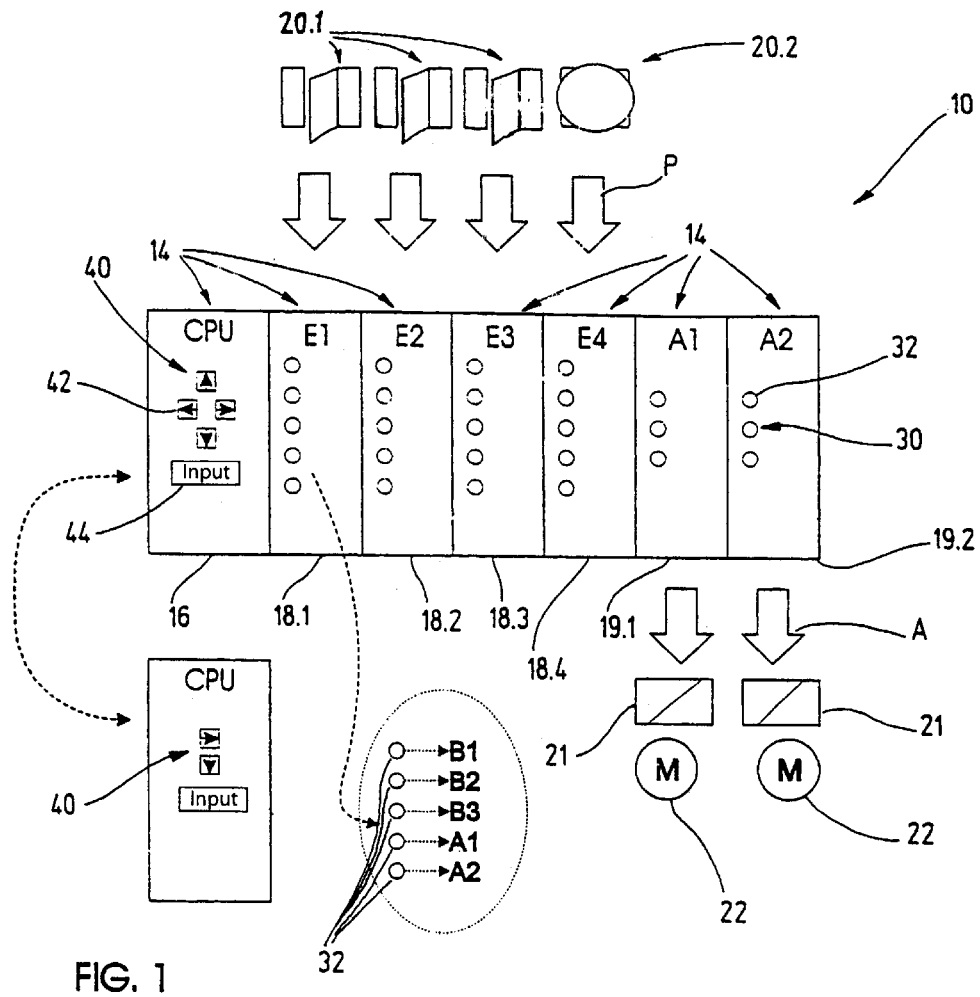
FIG. 1 shows a schematic block diagram of a modular safety switching device system according to a first exemplary embodiment.

In FIG. 1, a modular safety switching device system is identified by reference symbol 10. This safety switching device system comprises a large number of module places, not illustrated here, which in the present exemplary embodiment each accommodate a module 14. In particular, a control module 16, four input modules 18.1 to 18.4 and two output modules 19.1 and 19.2 are provided. In connection with the present invention, a module is understood to mean not only a structural unit but, alternatively, also a functional unit, it being possible for different functional units to be combined to form one structural unit.

On the input side, the input modules 18.1, 18.2, 18.3 and 18.4 are connected to signal transmitters, which is indicated by arrows P. The signal transmitters, which are identified by the reference symbol 20 in FIG. 1, are for example protective door switches 20.1 or an emergency off switch 20.2. In the present exemplary embodiment, the emergency off switch 20.2 is assigned to the input module 18.4 and the other protective door switches 20.1 are assigned to the input modules 18.1, 18.2 and 18.3.

The input modules 18 comprise evaluation and control units which evaluate the signals from the safety transmitter 20 in a fail-safe manner. Of course, it is also possible to provide the evaluation control units centrally in the control module 15. The basic structure of such input modules is disclosed, for example, in "Maschinensicherheit" [Machine safety], Winfried Gräf, Hüthig Verlag, 1997. Furthermore, application DE 100 11 211 from the present assignee shows the structure of such input modules. The disclosure content of this application is hereby incorporated by reference with regard to the structure of safety switching devices. These input modules are usually implemented with two channels, in order to achieve the required fail-safety in the evaluation of the input signals. Of course, it might also be considered to implement the input modules with a single channel, a checking unit then additionally being provided in order to check the signals.

The two output modules 19.1 and 19.2 provided usually comprise electromechanical or electronic switching elements which, depending on the input signals fed in, fail-safely switch to and fro between two switching states. The output signal from the respective output module 19.1, 19.2 is fed to an actuator, which is indicated by arrows A. The actuators are, for example, contactors 21, which can provide or interrupt the power supply to a motor 22, for example.

FIG. 1 further reveals that the input and output modules 18, 19 each comprise a display 30. In the present exemplary embodiment, the display 30 is implemented in the form of a plurality of light-emitting diodes 32, only some of the light-emitting diodes being identified by the reference symbol 32 for sake of clarity. Overall, the input modules 18.1 to 18.4 in the present exemplary embodiment each comprise six light-emitting diodes, and the output modules 19.1 and 19.2 each comprise three light-emitting diodes. It goes without saying that, instead of the light-emitting diodes, other optical elements can also be used. However, light-emitting diodes are particularly advantageous from the point of view of costs.

The control module 16 comprises an input unit 40, which is composed of a plurality of cursor keys 42, four in the present exemplary embodiment, and an input key 44. The use of four cursor keys makes very convenient input possible, while the alternative 40' likewise shown in FIG. 1 comprises only two cursor keys. Although this restricts the input convenience somewhat, it is more cost-effective to implement.

For reasons of clarity, the display 30 of the input module 18.1 is additionally illustrated in isolation in FIG. 1, the LEDs 32—from top to bottom—being labeled B1, B2, B3, A1 and A2. The labeling abbreviations indicated stand for different operating modes of the input module, B1 standing for the operating mode "start-up test", B2 for the operating mode "acknowledgment", B3 for "deactive", A1 for an assignment to the first output module and A2 for an assignment to the second output module. The operating modes themselves will be explained in more detail in the further course of the description.

It goes without saying that the number of LEDs has been chosen purely by way of example. If the respective input module permits more or fewer operating modes, fewer or more LEDs are correspondingly provided.

Since the output modules 19.1 and 19.2 can be set only into three different operating modes, only three LEDs 32 are consequently provided. Here, too, each LED 32 is allocated one operating mode, for example 0 s, 0.5 s and 1 s.

For the further description, a safety switching device system 10 will be assumed which permits both motors 22 to be switched off via the emergency off switch 20.2, and in which one of the motors 22 can be switched off via two protective door switches 20.1 and the other motor 22 can be switched off via the third protective door switch 20.1.

In order to achieve this function, it is therefore necessary for the output signal from the input module 18.4 to be fed to both output modules 19.1 and 19.2. Furthermore, the output signals from the two input modules 18.1 and 18.2 must be fed to the output module 19.1, and the output signal from the input module 18.3 must be fed to the second output module 19.2. The output signals fed to the output modules 19.1 and 19.2 from the input modules are each AND-linked with one another. In this state of the safety switching device system 10, the diodes A1 of the input modules 18.1 and 18.2, the light-emitting diode A2 of the input module 18.3 and the two light-emitting diodes A1 and A2 of the input module 18.4 illuminate. By using the lit light-emitting diodes of the input modules 18.1 to 18.4, it is therefore possible to determine the output module 19.1 or 19.2 on which the output signal from the respective input module acts.

The setting or configuration of the safety switching device system 10 into the aforementioned state is carried out as follows:

Firstly, a key switch not illustrated in FIG. 1 is actuated in order to switch the safety switching device system 10 into the programming mode. In this programming mode, the output modules 19.1 and 19.2 are switched off, so that the actuators 21 are not energized.

The selection of the LEDs begins at the uppermost LED of module 18.1 and is led on to the respective adjacent LED by each actuation of the horizontal or vertical cursor key 42. In the process, the selected LED is switched on or off briefly by the control module 16 via the respective output module 61, depending on the state displayed. A selected LED being switched on is switched on for a long time and switched off briefly. A selected LED which is switched off is switched off for a long time and switched on briefly. Thus the four LED states: on, off, on—selected, and off—selected can be distinguished. With each actuation of the input key 44, a changeover is made between the states on—selected and off—selected. As a result of the actuation of a cursor key, the state of the LED changes from on—selected to on or from off—selected to off, and the state of the next LED changes from on to on—selected or from off to off—selected.

Once the selection in an input module has been completed, an adjacent input module is selected by means of an actuation of the corresponding horizontal cursor key 42, and the procedure is repeated. At the end of the configuration, the LEDs for the operating modes A1 in input module 18.1, A1 in 18.2, A2 in 18.3 and A1 and A2 in 18.4 illuminate then.

Once the configuration of the safety switching device system 10 has been completed, the key switch is actuated again so that a change is made from the programming mode into the normal mode. In this process, the selected operating modes of the individual modules 18, 19 are stored in a memory in the control module 16.

It can therefore be seen that the safety switching device system can be configured very simply by actuating the cursor keys 42 and the input key 44.

Figure 4:
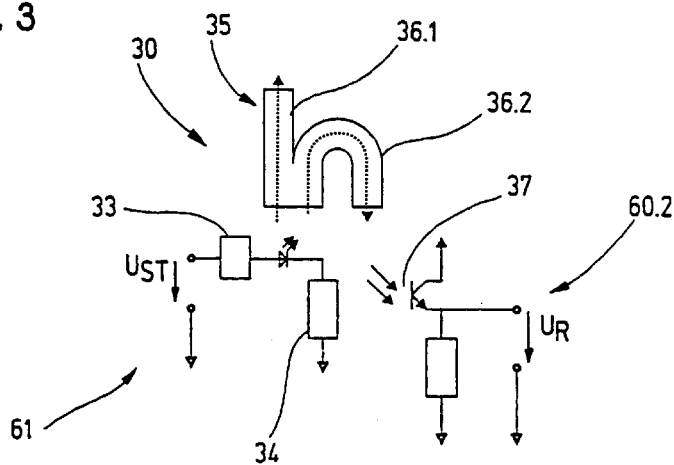
FIG. 4 shows a circuit diagram of a fail-safe display.

If the safety switching device system 10 is to correspond to European safety standards, care must be taken that erroneous programming caused by a faulty display of the operating mode is avoided. For this reason, the display 30 shown in FIG. 1 are of a fail-safe construction. In other words, this means that a faulty LED 32 is detected by the respective input module or output module and triggers the action of switching off the safety switching device system 10. With reference to FIG. 4, a possible implementation of a fail-safe display will be explained below.

FIG. 4 shows a display 30 which comprises an LED 32. The LED 32 is driven via driver 33, which is activated by a control voltage UST. There is also a resistor 34 in series with the LED 32.

The light emitted by the LED 32 is coupled into an optical conductor 35, which comprises two optical fibers 36.1 and 36.2. A first optical fiber 36.1 guides the light from the LED 32 outward, so that it can be seen by the user. A second optical fiber 36.2 guides the light from the LED 32 to an optical sensor 37 which, in the present exemplary embodiment, is designed as a phototransistor. Depending on the light registered, the optical sensor 37 generates a voltage UR.

This allows to detect a erroneous display by comparing the control voltage UST and the voltage UR read back.

In order to test the LED display, the control voltage can be switched on and off briefly, and therefore the ability of the LED display to be switched on and off can be tested. The test pulses are short in order not to disrupt the reading of the LED display.

The aforementioned structure is provided for each of the LEDs 32 shown in FIG. 1.

Figure 3:
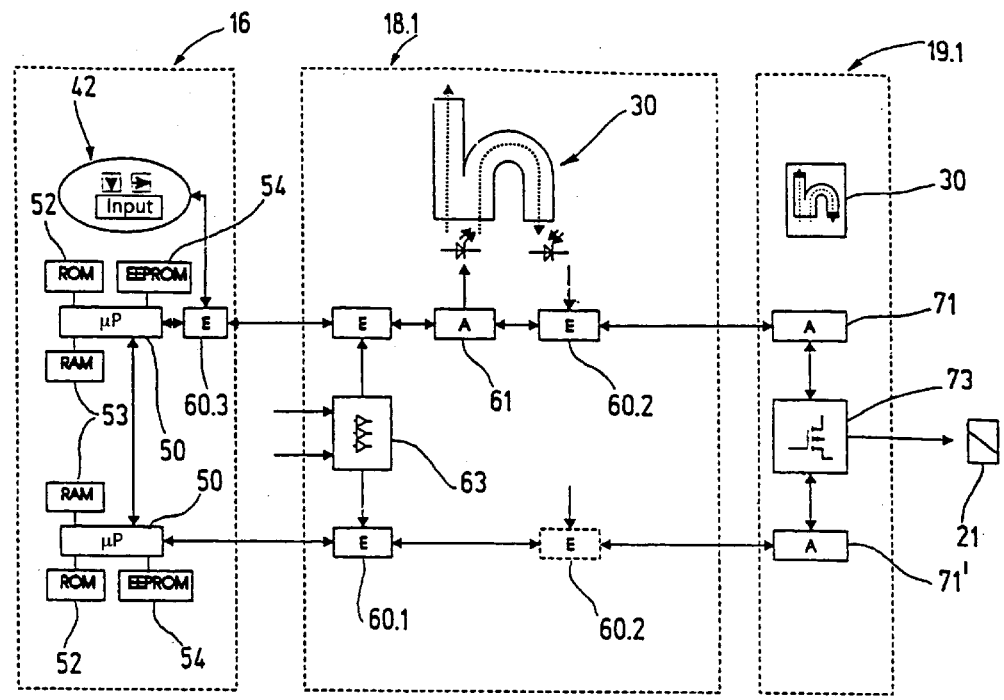
FIG. 3 shows a circuit diagram which shows extracts from an input module, a control module and an output module.

In FIG. 3, the input module 18.1, the control module 16 and the output module 19.1 are illustrated as block circuit diagrams in order to explain the interaction of these modules.

Firstly, the illustration in FIG. 3 makes it easy to see that all three modules are implemented with two channels, one channel being illustrated in the upper half and the other channel in the lower half of the figure.

The control module 16 has in one channel a microprocessor or microcontroller 50, which performs the control of the safety switching device system 10. Via data lines, a read-only memory (ROM) 52, a random access memory (RAM) 53 and an electrically erasable and re-writable memory (EEPROM) 54 are linked to the microprocessor 50. The second channel is implemented correspondingly, wherein different types of modules are usually used to achieve a same functionality in order to increase the fail-safety.

The control module 16 comprises the input unit 42 which has already been mentioned and which is connected to the microprocessor or microcontroller 50 via an input module 60.3. There is also a data link between the two microcontrollers 50 of the two channels, in order to allow to compare data and, in the event of non-agreement of the data from the two channels, to be able to trigger a fault reaction. The input module 60.3 is used to receive control signals which are generated by the input unit 40 of the control module 16. The input module 60.3 has the task of reading in the actuation of the keys of the input unit. At each actuation, the microcontroller drives the LED display appropriately.

The input module 18.1, which is representative of all the input modules 18.1 to 18.4, in one channel comprises a plurality of input and output modules 60 and 61, which are connected to one another via corresponding lines.

The input module 60.1 comprises means for a fail-safe evaluation of an input signal, which is supplied by the safety transmitter 20.1 via a read module 63. In the present exemplary embodiment, the evaluation is carried out in the control module 16. There, the signals read in and transmitted to the microprocessor 50 via the lines are checked with the stipulations that depend on the operating mode.

The output module 61 comprises the means of driving the LED 32, that is to say, for example, the driver 33 and the resistor 34. Furthermore, a second input module 60.2 comprises means for registering the light beam from the LED 32, i.e. photodiode 37, for example.

The second channel of input module 18.1, which is illustrated in the lower half of FIG. 3, likewise comprises an input module 60.1' and, optionally, an input module 60.2'. The input module 60.1' is likewise given the task of reading the signal supplied by the safety transmitter 20.1 via the second channel. The switching means needed for this purpose are known, so that it is not necessary to discuss their exact structure in more detail. The second input module 60.2' is optionally provided and has the task of generating a feedback signal on the basis of the function of the LED, so that this information can also be supplied redundantly to the control module 16.

The output module 19.1 shown in FIG. 3 comprises two channels which are identical from a functional point of view and each comprise an output module 71 and 71', respectively. The output module 71 is connected to the microcontroller 50 of one channel of the control module 16 via appropriate data lines, while the output module 71' is connected to the microcontroller 50 of the other channel of the control module 16. Both output modules 71, 71' forward the signals received to a switching element 73, shown schematically. This switching element 73 preferably comprises electronic switching elements, but electromechanical switching elements can also be used. The switching element 73 supplies a control signal which is fed to the contactor 21 and then switches the latter into the safe state if the safety transmitter 20.1 has been actuated. In addition, the switching capability of the switching element 73 can be tested via output modules, not shown, for example in the output module 19.1. A more accurate description both of the fundamental function of the input module 18 and of the output module 19 will be found in application DE 100 11 211 already mentioned above, so that reference can be made to this application.

Furthermore, the output module 19.1 comprises the display 30 which comprises a plurality of LEDs and, for simplification, is illustrated purely schematically in the form of a block. The implementation of this display 30 corresponds to the display 30 used in the input module 18.1, so that a repeated description is avoidable. The activation of individual LEDs of the display 30 is likewise carried out—as already mentioned—via the input unit 40 of the control module 16.

In FIG. 3, connections between the individual modules 16, 18 and 19 are illustrated purely schematically. This is intended to express the fact that signals are transmitted between the modules. The transmission of these signals or data can be carried out in different ways. One flexible but complicated way is to provide a signal and data bus, such as is known in different configurations and variants. In addition, in the area of safety engineering there are bus solutions which are fail-safe. A non-fail-safe communication with equipment outside the safety switching device system could additionally be made via a field bus, as it is known.

A further, constructively simpler solution for data transmission is to implement a shift register, whose individual cells or registers are each assigned to a module. The signals to be transmitted are then written into this register by the respective module, and the control module 16 can then read this information by transmitting appropriate clock signals.

It goes without saying that other solutions might also be considered.

The structure can be accommodated in separate plug-in modules for the functions of reading the safety transmitters (input module), control (control module) and actuator control (output module), or, given the same electrical design, can be accommodated in one housing in order to reduce costs.

The setting of the operating mode of the input module 18.1 may be carried out as follows:

The control module 16 is switched to the programming mode, which causes the microcontroller 50 to effect the safe state via outputs 73. The selection of the LEDs begins with the uppermost LED of module 18.1 and is passed on to the respective adjacent LED by each actuation of the horizontal or vertical cursor key 42. In the process, the selected LED is switched on or off briefly by the control module 16, via the respective output module 61, depending on the state displayed. A selected LED which is switched on is switched on for a long time and switched off briefly. A selected LED which is switched off is switched off for a long time and switched on briefly. The four LED states: on, off, on—selected and off—selected can therefore be distinguished. At each actuation of the input key 44, a change is made between the states on—selected and off—selected. As a result of actuation of a cursor key, the state of the LED changes from on—selected to on or from off—selected to off and the state of the next LED changes from on to on—selected or from off to off—selected.

The microcontroller 50 stores the selection of the operating mode made for the input module 18.1 in the EEPROM memory 54.

The procedure mentioned above is then repeated for all further connected input and output modules 18, 19. At the end of programming, the control module 16 is set back to the normal mode, so that actuation of the cursor keys 42 or of the input key 44 remains ineffective.

During normal operation, the signals supplied by the safety transmitters 20 are then processed in accordance with the operating mode selection stored in the EEPROM memory 54 and are supplied to the selected output modules 19.1 and 19.2. For all the operating modes which can be selected, the respective monitoring program parts, linking program parts and driving program parts are stored in the safety switching device system. Furthermore, the display 30 continue to be activated, so that the user has the possibility of informing him or herself at any time about the configuration of the safety switching device system 10.

Since the user is referred to the display 30 for the purpose of programming and checking the configuration, said display 30—as already mentioned—must be designed safely, so that an erroneous configuration caused, for example, by non-functioning LEDs is ruled out. This safety is achieved by comparing the drive signal UST with the feedback signal $U_R$, so that in the event of a fault the safety switching device system 10 can be brought into a predefined state.

According to operating modes A1 and A2 already described, manipulations of the safety transmitter associated with the input module can be discovered with the aid of the operating mode B1 (start-up test), in that the respective safety transmitter has to be opened or must have been opened after the installation has been switched on again. In operating mode B2 (acknowledgment), for example, after a protective door has been closed (closure of the corresponding protective door position switch), a push button associated with the input module must be actuated, with which the operator of the installation confirms that nobody is in the hazardous area to be viewed. In operating mode B3 (deactive), the safety transmitter, for example the protective door monitoring, is not operative, which is required during maintenance work, for example.

The aforementioned operating modes 0 s, 0.5 s and 1 s of the output modules 19 represent appropriately adjustable delay times for switching off the outputs. This means that active braking, for example of a motor, can be achieved, since the action of switching off the power supply is delayed. It goes without saying that other or further operating modes might also be considered.

Figure 2:
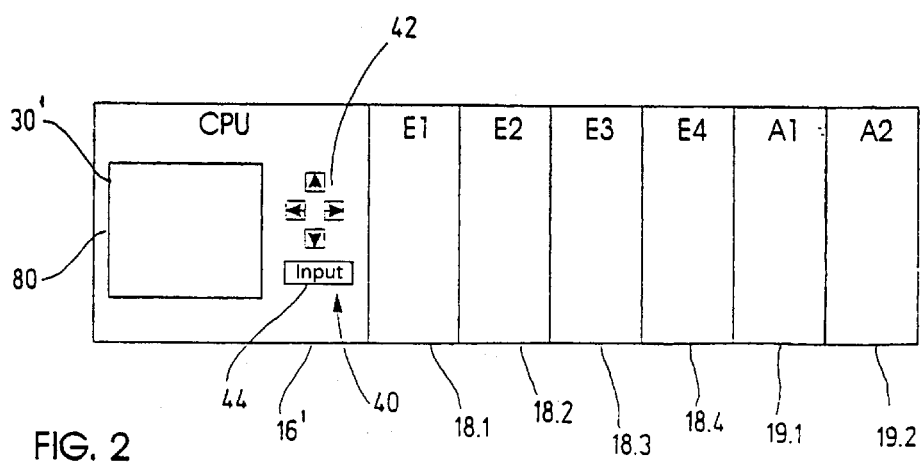
FIG. 2 shows a schematic block diagram of a safety switching device system according to a further exemplary embodiment.

A further exemplary embodiment of a safety switching device system is illustrated in FIG. 2 and identified by designation 10'. The mode of operation of this safety switching device system 10' corresponds to that of system 10 shown in FIG. 1, so that a repeated description can be dispensed with. In the following text, only the differences will be discussed.

The difference of the system 10' shown in FIG. 2 is that the decentralized display 30 have been moved from the input and output modules 18, 19 to the control module 16'. This means that the individual input and output modules 18, 19 no longer have LEDs 32 to display the operating mode. Rather, the control module 16' has a display 30' which is implemented as a display 80. The display 80 used can be, for example, a liquid crystal (LCD) display, which in recent times can be obtained at very favorable prices.

In the simplest case, the display 80 depicts the LEDs which are used in the first exemplary embodiment described with reference to FIG. 1. The selection of the operating modes can then be carried out in an identical way, the user obtaining the optical information about the selected operating modes centrally via display 80 in this case.

As already mentioned, in order to satisfy the various safety standards, it is necessary for the display 80 to be fail-safe, so that an erroneous configuration caused by an erroneous display can be ruled out.

One of a number of possible ways of making the display 80 fail-safe consists in subdividing the display into two areas, which display identical information in two different ways. For example, one area could be shown in a normal representation and the other area in an inverse representation. Then, by comparing the two representations, the user can check whether the display is faulty.

Figure 5:
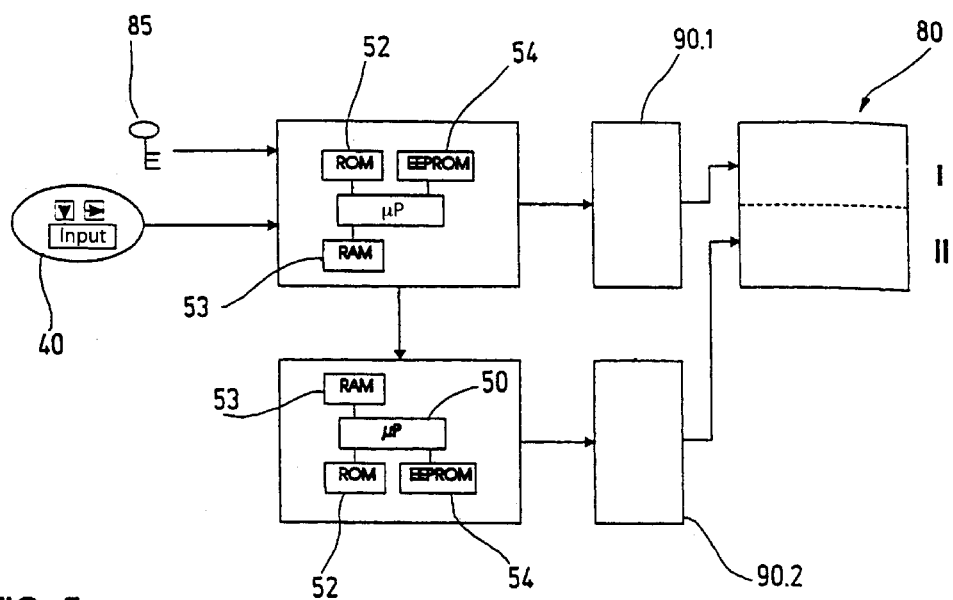
FIG. 5 shows a schematic block diagram of a control module, which is used in the system shown in FIG. 2.

FIG. 5 shows a block diagram which is used to explain this solution. The two-channel structure of a control module can again be seen in FIG. 5, each channel comprising a microcontroller 50 and appropriate memory units 52, 53 and 54. Each microcontroller 50 is assigned a display driving device 90.1 and 90.2. The driving device 90.1 controls the half of the display 80 designated by I in FIG. 5, while the driving device 90.2 drives the half of the display 80 designated by II. Although the control module 16 itself cannot detect a faulty display (for example damaged pixels in the display), the "two-channel" representation of the set operating modes achieves the required fail-safety on the display 80. By comparing the two display areas I, II, the user can detect whether there is a damage to the display 80.

Of course, it might also considered to read the display via an image recognition system and, in the control module, to compare the image actually displayed with an image which is to be displayed.

It goes without saying that, in addition to this route to a solution, there are many other possible ways of making the display 80 fail-safe. One possibility could be, for example, a display which supplies either a simultaneous doubled (diversitary) representation or a time-delayed double representation, for example a programming representation or an operating representation.

Beyond the pure depiction of the LED solution illustrated in FIG. 1 for the display of the operating modes, the display 80 can of course also be used for the representation of complex graphics and image elements. One possible practical implementation is shown by way of example in FIG. 6. Here, a linking matrix with individual switching elements is represented, one line in the matrix corresponding to an input module 18. By means of opening or closing the switching elements S represented graphically, the input modules 18.1, 18.2 and 18.3 can be AND-linked or OR-linked in any desired way. The graphical opening and closing of the switching elements S is carried out by selecting the desired switching element S with the aid of the cursor keys 42 and by actuating the input key 44. The switch S' can be configured to be open or closed.

Figure 6:
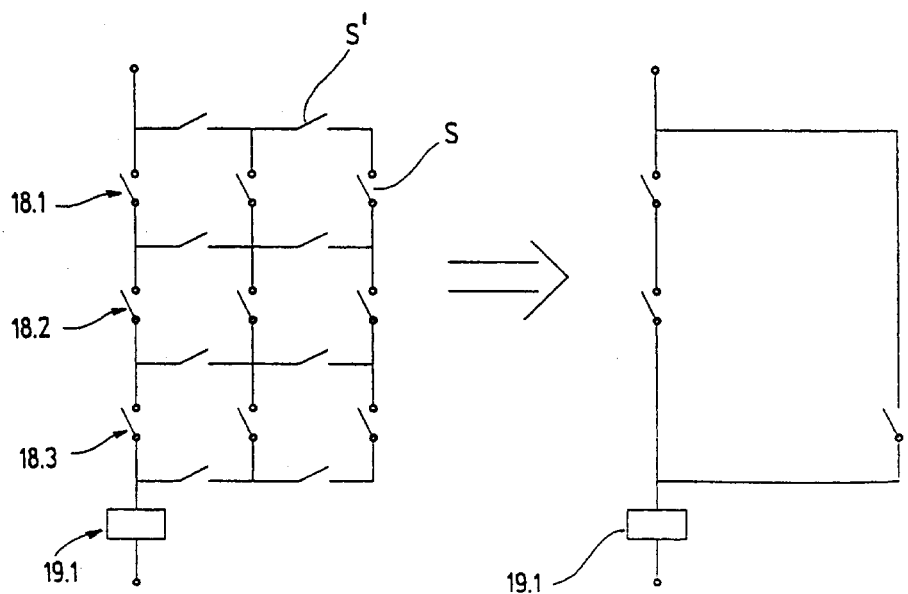
FIG. 6 shows a possible graphical representation relating to setting the operating modes of the input modules as could be represented by the display according to FIG. 5.

One possible combination of the input modules is represented in the right-hand half of FIG. 6. By means of the opened switching elements S, it is indicated that the input modules 18.1 and 18.2 are connected in series and act on the output module 19.1. In parallel with this series circuit, the input module 18.3 likewise acts on the output module 19.1. This means that the motor 22 associated with the output module 19.1 is stopped if the safety transmitter associated with the input module 18.3 and at least one of the two safety transmitters associated with the input modules 18.1 and 18.2 is actuated.

It is obvious that the safety switching device system 10' can be configured considerably more comprehensively as compared with the exemplary embodiment illustrated in FIG. 1, since the output signals from the input modules 18 can be AND-linked or OR-linked in any desired way. Furthermore, the graphical representation of these combinations permits considerably more convenient programming and checking of the selected operating modes.

It goes without saying that the graphical representation selected in FIG. 6 has a purely exemplary character and can be substituted by other graphical representations. For example, it might also be envisaged to represent the possible logic-linking elements and the input and output modules as "building blocks", to which access can be made via the cursor keys 42, on one part of the display 80, in order to build up a corresponding graphical representation of the desired combinations in the other area of the display. The fact that, when a building block is selected, the user expects the same representation of the building block in the other area of the display 80 means that an expectation is produced which makes it possible for a user to detect a faulty representation on the display 80.

In summary, therefore, it is to be stated that both the exemplary embodiment of a safety switching device system shown in FIG. 1 and also that shown in FIG. 2 permits configuration of input modules and output modules in a very simple manner without hardware changes, for example in the wiring, having to be made. The systems can be used very flexibly and can be adapted again and again, very quickly, to new requirements.

What is claimed is:

1. A modular safety switching device system for actuating actuators in a fail-safe manner, said system comprising:
a plurality of safety transmitters, each for generating a safety switching event;
a plurality of input modules for fail-safely evaluating said safety switching events and for generating output signals;
a plurality of output modules for fail-safely actuating an actuator in response to the output signals; and
a control module and a display;
wherein said input modules are configured to be operated in a number of different predefined operating modes;
wherein said control module is adapted for setting a desired operating mode for each input module; and
wherein said display is adapted for fail-safely displaying the operating modes set by the control module.

2. The system of claim 1, wherein said output modules are configured to be operated in a number of second predefined operating modes, said control module further being adapted for setting a desired second operating mode for each output module.

3. The modular safety switching device system of claim 1, wherein said display comprises a plurality of light-emitting elements, one for each predefined operating mode selectable via said control module.

4. The modular safety switching device system of claim 3, further comprising a light evaluation unit for checking a status of the light-emitting elements and comprising a plurality of feedback elements, each feedback element being assigned to one of said plurality of light-emitting elements and being connected to said light evaluation unit.

5. The modular safety switching device system of claim 4, wherein said feedback elements are optical conductors which guide a light emitted by the light-emitting elements to said light evaluation unit.

6. The modular safety switching device system of claim 5, wherein said display is implemented as a central display.

7. The modular safety switching device system of claim 6, wherein said central display is liquid crystal display device.

8. The modular safety switching device system of claim 6, wherein said operating modes are displayed in two different kinds on said central display, so as to enable a fail-safe representation.

9. The modular safety switching device system of claim 8, wherein said operating modes are displayed in two areas of said display, said areas being mutually independently driven.

10. The modular safety switching device system of claim 1, wherein said display is implemented as a self-luminous display and said system further comprising an image recognition device for checking the operating modes displayed.

11. The modular safety switching device system of claim 1, wherein said input modules each are implemented having two channels and comprising a semiconductor output.

12. The modular safety switching device system of claim 1, wherein said control module comprises a logic linking unit, which logically links the output signals from the plurality of input modules with one another and feeds them to said output modules.

13. The modular safety switching device system of claim 1, wherein said control module comprises a memory unit for storing the operating modes selected.

14. The modular safety switching device system of claim 1, further comprising assigned a configuration switch for changing over said control module into a programming mode.

15. The modular safety switching device system of claim 1, wherein said control module comprises an input unit for entering said operating modes.

16. The modular safety switching device system of claim 15, wherein said input unit comprises at least two cursor keys and a confirmation key.

17. A modular safety switching device system for actuating an actuator in a fail-safe manner in response to a safety switching event received from a safety transmitter, said system comprising:

at least one input module for fail-safely evaluating said safety switching event and for generating an output signal;

at least one output module for fail-safely actuating said actuator in response to said output signal;

a control module and a display;

wherein said input module is configured to be operated in a number of first different operating modes;

wherein said control module is designed for setting a desired operating mode selectable from said number of different predefined operating modes; and wherein said display is adapted for fail-safely displaying said operating mode set.

18. The system of claim 17, wherein said output module is configured to be operated in a number of second predefined operating modes, said control module further being designed for setting a desired second operating mode for said output module.

19. The modular safety switching device system of claim 17, wherein said input module comprises a plurality of light-emitting diodes for displaying the operating mode set.

20. The modular safety switching device system of claim 19, comprising a light evaluation unit for checking a status of the light-emitting diodes and further comprising a plurality of optical conductors each guiding a light emitted by the light-emitting diodes to said light evaluation unit.

21. The modular safety switching device system of claim 17, wherein said display is implemented as a central display.

* * * * *

UNITED STATES PATENT AND TRADEMARK OFFICE
CERTIFICATE OF CORRECTION

PATENT NO. : 6,778,080 B2 Page 1 of 1
DATED : August 17, 2004
INVENTOR(S) : Richard Veil et al.

It is certified that error appears in the above-identified patent and that said Letters Patent is hereby corrected as shown below:

Title page,
Item [*] Notice, should read -- Subject to any disclaimer, the term of this patent is extended or adjusted under 35 U.S.C. 154(b) by 90 days. --

Signed and Sealed this

Nineteenth Day of July, 2005

JON W. DUDAS
*Director of the United States Patent and Trademark Office*